United States Patent
Bao et al.

(10) Patent No.: US 9,451,179 B2
(45) Date of Patent: Sep. 20, 2016

(54) AUTOMATIC IMAGE ALIGNMENT IN VIDEO CONFERENCING

(71) Applicant: Cisco Technology, Inc., San Jose, CA (US)

(72) Inventors: Xiangyu Bao, Campbell, CA (US); Thomas Fussy, Portola Valley, CA (US); Vladimir Stepin, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 79 days.

(21) Appl. No.: 14/315,937

(22) Filed: Jun. 26, 2014

(65) Prior Publication Data

US 2015/0381902 A1    Dec. 31, 2015

(51) Int. Cl.
*H04N 7/14*    (2006.01)
*H04N 5/262*   (2006.01)
*H04N 7/15*    (2006.01)

(52) U.S. Cl.
CPC .......... *H04N 5/2621* (2013.01); *H04N 5/2624* (2013.01); *H04N 5/2628* (2013.01); *H04N 7/147* (2013.01); *H04N 7/15* (2013.01)

(58) Field of Classification Search
USPC .................. 348/14.07, 14.16, E7.084, 218.1, 348/E5.024, 14.09, 14.15, 14.1, E7.018, 348/274, 383
See application file for complete search history.

(56) References Cited

U.S. PATENT DOCUMENTS

| | | | |
|---|---|---|---|
| 6,597,818 B2* | 7/2003 | Kumar | G06T 3/0081 382/284 |
| 2010/0188478 A1* | 7/2010 | Robinson | H04N 7/15 348/14.16 |
| 2011/0069148 A1* | 3/2011 | Jones | H04N 5/232 348/36 |

OTHER PUBLICATIONS

Cisco TelePresence System TX9000 and TX9200 Assembly, Use & Care, and Field-Replaceable Unit Guide, Apr. 10, 2014, Cisco Systems, Inc.
U.S. Appl. No. 13/793,524, filed Mar. 11, 2013.

* cited by examiner

*Primary Examiner* — Yosef K Laekemariam

(57) ABSTRACT

In one implementation, at least two images are captured from a respective at least two cameras of a telepresence system. The at least two cameras have horizontally overlapping fields of view such that the at least two images horizontally overlap. A processor identifies, by image processing of the overlap of the at least two images, portions of each of the at least two images. The portions spatially correspond to adjacent displays and do not include the overlap. Subsequent images captured by the at least two cameras are displayed on the adjacent displays in a video conference. The displayed images are for the portions of the field of view corresponding to the adjacent displays.

21 Claims, 5 Drawing Sheets

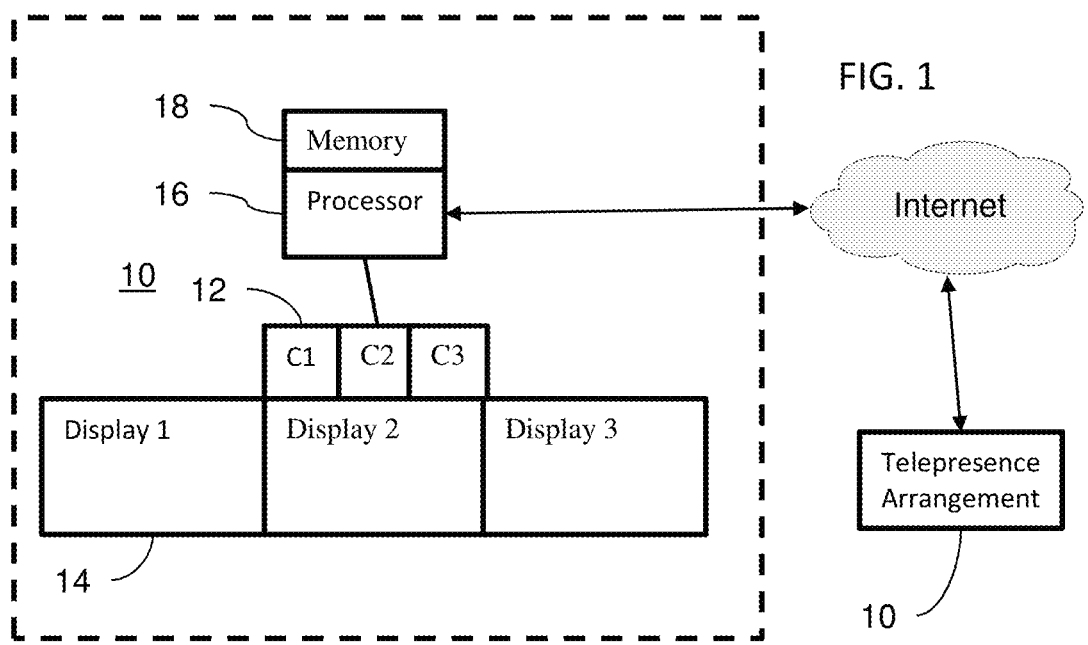
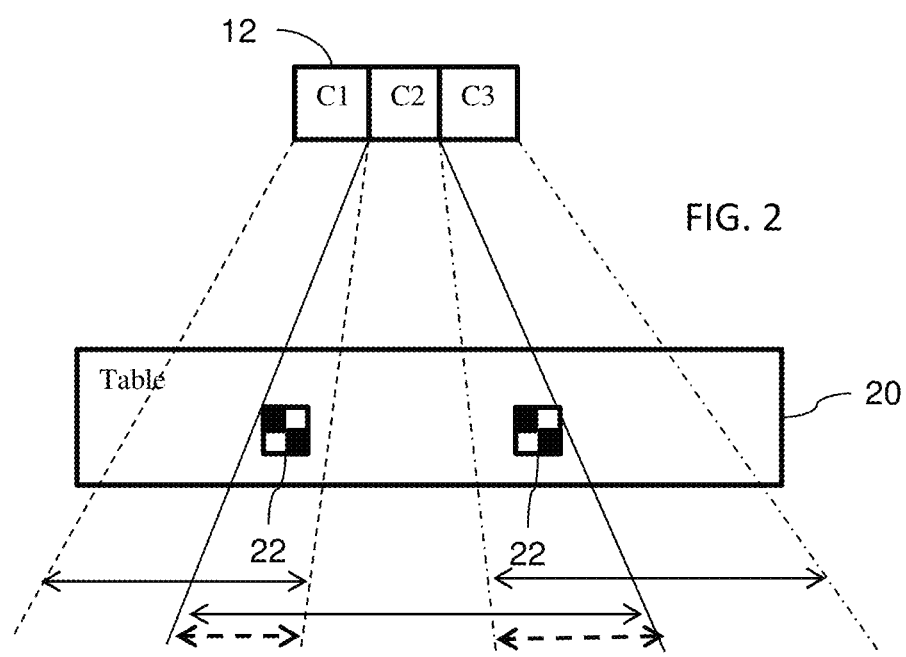

AUTOMATIC IMAGE ALIGNMENT IN VIDEO CONFERENCING

TECHNICAL FIELD

The following disclosure generally relates to image alignment and, more particularly, to image alignment in video conferencing applications using multiple fields of view.

BACKGROUND

Immersive telepresence systems are equipped with a cluster of cameras to create a life-size view of meeting participants across a conference room. Each camera has a fixed field of view (FOV) and captures a pre-defined seating segment within the room. The FOVs captured by the cluster of cameras cover non-overlapping adjacent ones of the pre-defined seating segments. When images from the camera cluster are displayed on abutting screens, the images appear as if taken from a single camera with a very wide FOV. To achieve this effect, the cameras must be carefully installed to ensure proper alignment, avoiding noticeable image duplication (overlap) as well as dead zones (non-realistic spacing apart) between adjacent images. This alignment of the fields of view is done by manually adjusting the cameras, which is a very tedious, time consuming and error prone process. While the relatively large bezels of screens used today may provide some tolerance to perceivable misalignment between adjacent images, accurate connection of images without noticeable defects between adjacent camera views becomes increasingly difficult as the screen bezels become thinner and thinner.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts.

FIG. 1 is a simplified block diagram of one embodiment of a telepresence system;

FIG. 2 illustrates example overlapping fields of view of a camera cluster of a telepresence arrangement;

DESCRIPTION OF EXAMPLE EMBODIMENTS

Overview

Figure 3:
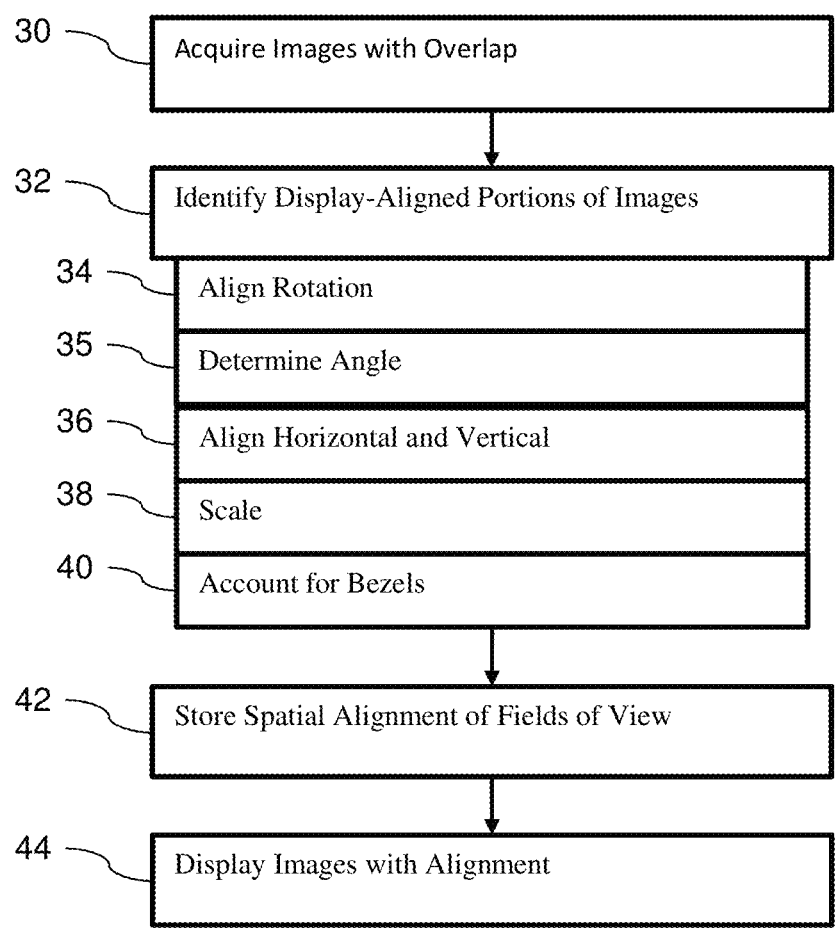
FIG. 3 is a flow chart diagram of one embodiment of a method for automatically aligning images from a camera cluster for display on adjacent displays.

Cameras of a telepresence system are installed with automated alignment. Rather than manual and/or physical alignment, cameras with overlapping fields of view are used for automated alignment. Image processing is performed to determine the portions of the fields of view for each camera that correspond to providing adjacent displays with an appearance of a non-overlapping, continuous field of view. The image processing identifies portions avoiding noticeable image duplication (overlap) and dead zones despite the actual fields of view having overlap.

In one aspect, at least two images are captured from a respective at least two cameras, the at least two cameras having horizontally overlapping fields of view such that the at least two images horizontally overlap. A processor identifies, by image processing of the overlap of the at least two images, portions of each of the at least two images. The portions spatially correspond to adjacent displays and do not include the overlap. Subsequent images captured by the at least two cameras are displayed on the adjacent displays in a video conference. The displayed images are for the portions of the field of view corresponding to the adjacent displays.

In another aspect, logic is encoded in one or more non-transitory computer-readable media that includes code for execution. When executed by a processor, the logic is operable to acquire images from video conferencing cameras with overlapping fields of view, aligning the fields of view by digital image processing of the images, and storing a spatial alignment of the fields of view as a calibration.

In yet another aspect, a cluster of cameras has overlapping fields of view. A memory is configured to store frames of data from the cameras. The frames of data represent the overlapping fields of view. A processor is configured to select non-overlapping parts of the fields of view from information detected in the frames of data. The non-overlapping parts are selected by the processor to align and scale the non-overlapping parts relative to each other.

Example Embodiments

In immersive telepresence systems, higher resolution cameras may be used to form the camera cluster. The camera images are oversampled and fields of view (FOVs) between adjacent cameras are partially overlapped. Due to the overlap, camera alignment errors may be compensated by using the oversampled pixels. A digital image process and a simple user interface realizes a relaxed requirement for the initial installed camera position and provides automated camera alignment without mechanical adjustment of the cameras or focal positions relative to each other. Rather than stitching images for different displays together, an automated process finds portions of the fields of view that correspond to the relative positions of displays such that each transmitted image is to be produced out of one oversampling camera and to be displayed on one screen. A near or at life-size continuous view with a relaxed requirement for manual camera positioning and simplified operations for system installation may be provided.

In one embodiment, a cluster of oversampling cameras is used to provide partially overlapping FOVs between adjacent cameras. The cameras have spatial extent greater than needed for the final life-size view. No special restriction is required in manufactory errors or tolerances for individual cameras as well as camera pointing angles. Between each adjacent overlapped FOV, a known reference point (P1) close to a table is used. A known non-vertical reference line (L1) across each overlapping FOVs, which is at least vertically a few inches away from the reference point P1, is also used. Any number of points and/or lines may be used. The reference points and lines may be extracted from a checkerboard or other target in the overlapping FOV between adjacent camera views. Any pre-defined, known, or selectable marker on the table, the back wall, or other location may be used in place of a target. The parts of the fields of view to use for life size or near life size (e.g., within 10%) images are automatically detected by a processor. The reference points and/or lines are used in digital imaging process to align the cameras without physical movement of the cameras. Due to the overlapping fields of view, an automated or one button push image alignment may be achieved by digital image processing.

FIG. 1 shows a telepresence or other video conferencing system. The system includes two or more telepresence arrangements 10 connected through one or more networks. In the example of FIG. 1, the network is the Internet, but the network may be a local area, wide area, enterprise, or other network. The telepresence arrangements communicate using a real-time protocol (RTP) for video, audio, and/or presentation information. One or more servers, encoders, decoders, or other processors may be provided as part of or for communications between arrangements 10 or within the network.

Each telepresence arrangement 10 may be the same or different. In one embodiment, the telepresence arrangement 10 includes two or more cameras 12, two or more displays 14, a processor 16, and a memory 18. Additional, different, or fewer components may be provided. For example, one or more microphones and speakers are provided. As another example, user interface components for installation or activation of automated image alignment are provided. In yet another example, the displays 14 are not provided.

The displays 14 are liquid crystal display (LCD), organic light emitting diode (OLED), flat panel display, plasma, solid state display, cathode ray tube (CRT), a projector, a printer or other now known or later developed display device for display images or videos. The images or video may be of participants in a telepresence event, the table 20, and/or targets 22. One or more of the displays 14 may act as part of a user interface to arrange, install, calibrate, or configure image alignment. When used for conferencing, the displays 12 local to a cluster of cameras 12 display images from cameras 12 at remote or other locations.

The cameras 12 are any device operable to convert light rays to digital data. For example, semiconductor charge-coupled devices (CCD), active pixel sensors in complementary metal-oxide-semiconductor (CMOS), N-type metal-oxide-semiconductor (NMOS), or other types of photo sensor or photo sensor array devices may be used. Further, the digital conversion may be accomplished using any digitizing technique.

The cameras 12 are in a cluster for operation together. The cluster may provide for communication with a common processor 16 and/or physical integration. In one embodiment, the cameras 12 of the cluster share a same housing. The cameras are fixed within the housing to have overlapping fields of view. In other embodiments, mechanical adjustments or moveable mountings may be provided for the cameras 12 within the same housing for altering the amount of overlap. In yet other embodiments, the cameras 12 are separately housed and positioned to provide overlap.

The cluster of cameras 12 are at any location within a room. In the embodiment represented in FIG. 1, the cameras 12 are positioned in a housing above or on a top of a center display 14 of a three display set up. The cameras 12 may be positioned on a wall or ceiling, on a stand, or hung.

Each camera 12 captures an image in a field of view. The image is represented by a frame of data. Each frame of data provides a captured image at a given time.

The field of view may be any area or space positioned relative to the camera 12 such that the light rays corresponding, or emanating from, the field of view travel to the camera 12. A horizontal aspect of fields of view is illustrated in FIG. 2. Three cameras 12 are shown. The field of view for each camera 12 may be defined by a vertical range of angles and a horizontal range of angles relative to an origin at a point at the camera 12. For example, a wide angled field of view may involve a vertical angle of 25.2 degrees and a horizontal angle of 45 degrees. Other ranges may be provided. In the example of FIG. 2, camera C1 has a horizontal field represented by the dashed lines, camera C2 has a horizontal field represented by the solid lines, and camera C3 has a horizontal field of view represented by the dashed-dot lines. Any vertical field of view may be provided.

In FIG. 2, the fields of view overlap as represented by the bolded, dashed arrows. The fields of view of camera C1 and C2 overlap, and the fields of view of camera C2 and C3 overlap. This overlap occurs by design, e.g. 10 degrees, and may have large tolerance on assembly misalignment.

The field of view may be selected such that light rays from participants would be in the field of view. The participants may be participants in a video-conference or other telepresence event. The entirety of a participant may not necessarily be included in the field of view. Instead, a field of view may be selected that appropriately or adequately represents the participants for communicative purposes in a telepresence experience.

For telepresence, the fields of view are directed to and above a table 20 (see FIG. 2). For image alignment, one or more targets 22 are positioned on or near the table 20. The targets 22 are positioned within the overlapping regions of the fields of view. Rather than having specifically designed targets, other objects may be used as the target, such as the table 20 itself (e.g., joins or other markings on a table), a picture on a wall, wall paper pattern, a chair, or decoration.

If no further alignment were to occur, the images captured by the cameras 12 would include overlapping parts of the room. When displayed on corresponding displays 14 of a remote telepresence arrangement 10, an undesired display occurs. A same part of the environment is shown on each of multiple displays. For example, a person's elbow may be shown on two different displays. For immersive telepresence, the goal is to have non-overlapping fields of view representing the environment near to life size with the fields of view corresponding to the positions of the displays relative to the table. In the example of FIG. 1, the three displays 14 would have images captured from similarly adjacent (e.g., abutting or abutting except for the thickness of the bezels) fields of view.

The memory 18 and processor 16 are part of a computer used for installation or calibration to align the images. In one embodiment, the memory 18 and processor 16 are part of a mobile tool, laptop, or other device temporally connected for aligning images. In another embodiment, the processor 16 and the memory 18 are part of a server or computer for also provided for hosting or participating in video conferences with the telepresence arrangement 10.

For aligning images, the memory 18 is a local or remote memory, such as a cache, RAM, flash, hard drive, database, or other memory. The memory 18 is configured by the processor 16, other controller, or host to store information used in aligning images. For example, the memory 18 is configured to store frames of data from the cameras 12. The frames of data represent images, such as storing an image captured by the cameras 12 at a same time or within a same second and including overlapping fields of view. Images are used herein to include frames of data that have not yet been used to display but may be used, with or without further processing, to display an image to a viewer. Images may also include frames of pixel values or other display values and/or data of past displays.

Alternatively or additionally, the memory 18 is a non-transitory computer readable media storing logic that includes code for execution by the processor 16. When the processor 16 executes the code from the memory 18, the processor 16 is configured to align images.

The processor 16 is a general processor, application specific integrated circuit, field programmable gate array, control processor, graphics processing unit, graphics processor, or other computing device. The processor 16 is configured by hardware and/or software to use the images from the cameras to align the cameras. The processor 16 uses information identified in the overlapping parts of the fields of view to determine an alignment of the cameras. For example, the processor 16 is configured to select non-overlapping parts of the fields of view from information detected in the frames of data. The selection of the non-overlapping regions aligns and scales the non-overlapping parts relative to each other so that cascaded, adjacent displays of different parts of the environment are displayed on adjacent displays. In one embodiment, the processor 16 is configured to select as a function a table edge detected in the frames of data and a target 22 detected in the overlapping parts of the field of view represented in the frames of data. The table edge and target 22 are used to align and/or scale.

In response to activation by a user or other trigger, the processor 16 determines the portions of the fields of view of the cameras 12 that share the spatial distribution of corresponding displays 14 of another telepresence arrangement 10. Where the displays are positioned for life size or near life size display in a video conference, the processor 16 determines what parts of the fields of view provide for the same spatial arrangement for capturing the images. Image processing by the processor 16 is used to align during subsequent use of the cameras rather than requiring manual alignment of the cameras 12.

FIG. 3 shows a method for automatically aligning images from different cameras. In the example of FIG. 3, acts 30-40 with or without act 42 are performed by one telepresence arrangement, and the output of act 42 is used to perform act 44 in a different telepresence arrangement. Images are captured by cameras in act 30, and a processor performs the alignment acts 32-40. The processor causes storage in act 42 of the spatial alignment in a memory. The spatial alignment is used for display during a video conference in act 44.

Additional, different, or fewer acts may be performed. For example, acts 34-40 represent one approach for processor selection or determination of alignment of images. Other approaches for processor determination may be used. As another example, act 34, act 35, act 38, and/or act 40 are not performed. In yet another example, an act for user confirmation and/or user manual adjustment of a field of view of one or more cameras is provided.

The acts are performed in the order shown. In other embodiments, other orders are provided, such as scaling in act 38 before aligning in act 36. FIG. 3, except for act 44, represents acts performed for an initial installation of the telepresence system or acts performed as part of a later calibration. Act 44 represents use of the installation or calibration in any number of later video conferences. Act 44 is performed using the alignment determined at the installation and/or later calibration.

The images are aligned using digital or image processing rather than physical adjustment. Given overlapping fields of view, image processing is used to automatically determine the appropriate portions of the fields of view to display during a video conference. Since the actual fields of view of the cameras capture more than the desired portions, automated processing to identify the portions and use just the portions may be performed without having to re-aim or manually adjust the fields of view of any of the cameras. In other embodiments, an initial manual adjustment may occur to assure sufficient overlap of the fields of view.

In act 30, images are acquired from video conferencing cameras. The images are acquired as frames of data from the cameras. Alternatively, the images are acquired as frames of data retrieved or loaded from memory.

The cameras with the overlapping fields of view are used to capture images at a same time or within a short period (e.g., within 10 seconds or less of each other). The frames of data from the cameras represent overlapping regions of the environment. Any amount of overlap may be provided, such as the fields of view of two cameras overlapping by about 5-15% horizontally. FIG. 2 shows example horizontal overlapping of the fields of view. For three cameras, the field of view of the center camera overlaps with each of the other fields of view. The fields of view for the cameras capturing end regions overlap with one other field of view. In one embodiment, the images are captured from cameras in a shared housing mounted above a display. As mounted at manufacture or as assembled into the shared housing, the cameras have overlapping fields of view.

A single image is captured by each camera. Any number of two or more cameras may be used. In examples described below for FIGS. 4-10, three cameras capture three images with overlapping fields of view, as represented in FIG. 2. In other embodiments, more than one image may be captured by each camera, such as where the process is repeated and/or images are combined for processing.

In one embodiment, the images for each camera include a table and table edge. The same table or different parts of a table are captured in the different fields of view. The conference room environment or at least the table is arranged relative to the cameras before image capture. The cameras are manually positioned to include the table edge in the fields of view. The table edge may be straight through each field of view. Alternatively, the table curves or has angular changes along a side. In other embodiments, the table is not in the images captured. The alignment may be performed without positioning relative to the table, such as where the cameras may be aimed based on an expected position of the table.

In a further embodiment, the images include one or more targets. In the example of FIG. 2, a target is positioned in each of the overlapping portions of the fields of view. Any target may be used, such as a checkerboard pattern. Diamond, circular targets, or other patterns may be used. In alternative embodiments, the user or processor identifies environmental structure, such as a chair (i.e., an object in or common to both images), in the overlapping regions without placement of an added target. The environmental structure is used as the target.

Figure 4:
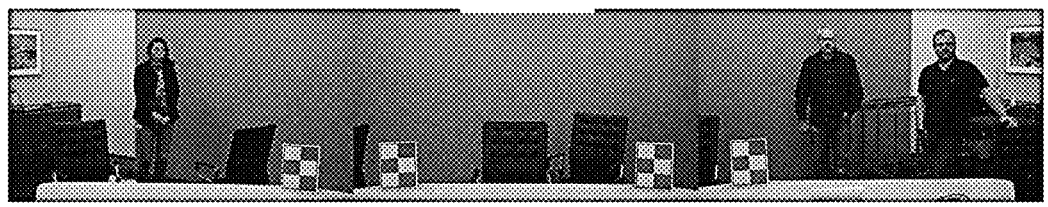
FIGS. 4-10 are example images showing different stages of digital image processing-based alignment.

FIG. 4 shows an example of captured images where snap shot images are taken from a cluster of cameras. The cluster of cameras includes two end cameras and one or more middle cameras. One center camera is used in the example of FIG. 4. The images and corresponding frames of data are oversampled with overlapped views between each pair of adjacent cameras. For example, each camera captures a frame of 4 k×2 k pixels for use with 1080p displays. Greater, lesser, or no oversampling may be used. The oversampling provides for a field of view greater horizontally and vertically than needed for life size display. As shown, the fields of view overlap sufficiently to capture the each checkerboard target in two of the images.

In act 32, portions of each of the images are identified. The portions to be identified spatially correspond to adjacent displays on which images are to be displayed. Where the displays are spaced from each other, the portions have the same or similar spacing. Where the displays abut each other, the portions likewise abut each other. For example, the portions corresponding to the displays are to have no overlap and no dead space other than for a bezel and small (e.g., 1 inch) gap. Since each image is to be displayed on separate displays, even if seamless separation is provided by using contacting displays with no bezel, the portions do not need to be stitched together. Instead, separate image portions are maintained for the separate displays.

The portions do not overlap as the displays do not overlap. For telepresence, the portions of the fields of view are to appear visually similar to viewing the displays of the image portions as if part of the environment, whether life size or not. The spatial arrangement of the displays is linked to and used for identifying the spatial arrangement of the portions of the images. The overlapping is used for aligning and not for display. Part of the overlapping region may be displayed, but the same parts are not displayed in multiple of the images.

Due to the availability of overlapping information, image processing of the acquired frames of data by a processor identify the portions. The processor identifies the portions by spatially aligning the images (i.e., determining a spatial offset or transform of one camera to another). The differences in scale and the spatial offset are determined by the processor and used to identify the portions. In the examples provided below, the use of de-warping, cropping, removal, translation, rotation, alignment, and/or scaling is for identifying the portions. The actual images themselves are or are not cropped or changed.

The processor identifies the portions without manual adjustment of the fields of view of the cameras relative to each other. Rather than manual adjustment, the oversampled and overlapping fields of view are used to select the portions to use for display. Manual adjustment is not needed since the cumulative field of view already includes the various portions for display. Overlap in the displayed images is avoided by image processing to determine the alignment and/or scale. The fields of view are aligned by digital image processing of the images.

In one embodiment, the center image is used as a reference image. The adjustments, other than de-warping, rotations, cropping and/or vertical selection, are applied to other images relative to the center image. In other embodiments, there is no reference image. In yet other embodiments, an end or non-center image is used as the reference image.

Acts 34-40 represent one approach for identifying the portions. Other approaches using some or none of the acts 34-40 may be used. For example, the images may be correlated with each other using different relative rotations, scales and/or translations. A maximum correlation provides the relative rotation, scale, and/or translations to align two images. Once aligned, the portions corresponding to the spatial distribution of the displays is identified.

In act 34, the relative rotation of the images to each other is determined. The target, table or other information indicating a relative rotation is detected by the processor. For example, a table edge is detected in each of the images. Any edge detection may be used, such as directional filtering, gradient calculation, or other image processing. In one embodiment, a longest line in the image is detected as the table edge. The image is low pass filtered for smoothing. A hue saturation value (HSV) transfer function is applied to the intensities or color data of the image. Sobel or other filtering is applied on the value image to enhance the edges. The line is detected from the resulting frame of data. In line detection, any straight lines in the XY plane are represented as $y=kx+b$, where x and y are spatial axes, k is the slope, and b is a displacement. In the k-b plane, each point in the image is mapped to a line in the XY plane. The maximum valued point in line detection is the longest line in XY plane. Other straight line or curved line detection may be used, such as directional filtering, curve fitting, or pattern matching. The detection of the table edge may be limited to a lower portion of the field of view.

The geometric shape of the table edge is known. Using the shape of the table edge, position of the table relative to the cameras, and expected location of the fields of view relative to the table, the expected rotation of the table edge in each image is known. Where the angle of the detected table edge differs from the angle of the expected edge, the relative rotation is determined. One image may be rotated relative to another image or relative to an expected angle using the detected table edges. The amount of rotation is calculated based on the relative angle of the table edge to an expected edge.

In another embodiment, the table edge is straight through all the fields of view. The table edge in each field of view is adjusted or even de-warped to be horizontal or other angle, providing the rotation for each camera. In another embodiment, the amount of rotation of one image is determined by matching the rotation of another image, such as a reference.

Figure 5:
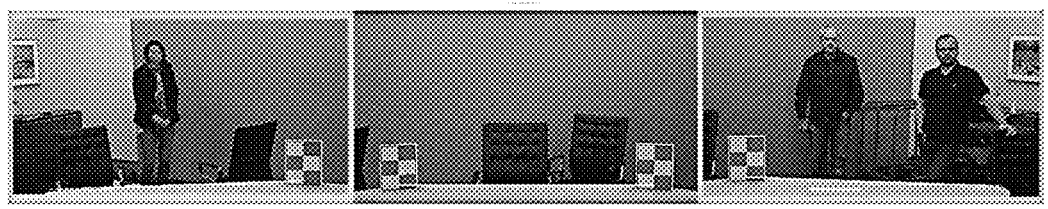

FIG. 5 shows an example of the rotation relative to FIG. 4. The table edge of the center image is rotated to be horizontal or not rotated if already horizontal. Given the geometric relationship of the table edge to the end cameras, an expected amount of rotation appearance is known or calculated. The table edges detected in the end images are rotated to the expected angles, such as rotating to position the edge at 5 degrees from horizontal. FIG. 5 shows the two outer images rotated to the desired positions.

The rotation may result in further or less overlap and/or data in upper and lower positions not in the portions. In FIG. 5, this data is blocked out or excluded as being within the portion. The processor may crop, remove, or not use the data from these regions for further processing. The blocked out regions in FIG. 5 stand for the wasted or not used pixels, which cannot be used for display.

In act 35, a camera angle is calculated by the processor for one or more of the images and corresponding cameras. The angle may be a one, two, or three dimensional angle. For example, a down angle is calculated. Where the cameras are placed above the displays or other location above the table, the cameras are directed down towards the table. The processor determines a down angle, generally setting the vertical position of the portion to be used and/or allowing for accounting of optical distortion.

In one embodiment, the down angle is determined from the detected table edge. The table edge is positioned a certain distance above the bottom portion. Stated another way, the bottom of the portion is positioned within the field of view so that the table edge is at a certain distance from the bottom of the portion. The distance may be calculated as a real world distance. Alternatively, the distance is in a number of pixels or rows within the frame of data or image. Where the table edge is at an angle away from horizontal, the distance is for a mean, maximum, minimum, center, and/or ends of the table edge in the image.

Figure 6:

FIG. 6 shows an example. The table edge is used to position the portion so that the table edge is at desired rows of pixels from the bottom of the portion. The bottom may be positioned in the calculation of the down angle without determining a value for the angle. Any rows of pixels below the bottom of the portion are cropped.

Once the down angle is determined and after or before the cropping, the images may be de-warped. The angle or bottom position of the portion based on the angle are used with other geometric information to counter optical affects due to the relative position and downward angle of the camera to the table and region in which conference participant will be. Aim down angle de-warping is performed to assure a smoother visual connection between images. Other angle de-warping maybe performed to assure smooth objects geometric shape preservation across images. Any de-warping may be used, such as keystone. The user inputs or pre-determined constants are used from the conference room setup for de-warping, such as camera height, table height, table distance from the camera, and camera cluster structure parameters, such as a relationship of sensor planes inside the camera.

In act 36, the images are aligned horizontally and vertically. While the down angle may establish a general vertical position, the processor refines the position by aligning the images relative to each other. The alignment also establishes the relative horizontal positions of the fields of view. To align, the processor processes the image to identify a reference point, points, lines, area, or areas common to two images. A reference within the overlap in the images is identified in each of the images. The same object is identified in each image.

Any reference may be used. In one embodiment, the reference is a point on a target. The processor detects the point in the target in the overlap captured by two images. Any detection may be used, such as through filtering, region growing, dilation, or other processes. In one embodiment, pattern matching is used. Where the target is known or pre-determined, a template or mask of the target is used as a pattern. By correlating the pattern at different locations in the image, the location with the greatest correlation indicates the position of the target in the image. The correlation search may include rotation and translation or just translation. Any search pattern may be used. In one embodiment, only the sides of the image are searched since the pattern is to be located in the overlap.

Once the pattern position in the image is determined, the location of any point within the pattern and, thus, the image is known. Multiple points, lines, or areas are known. The point or other position is determined in each of two images with overlap.

Figure 7:
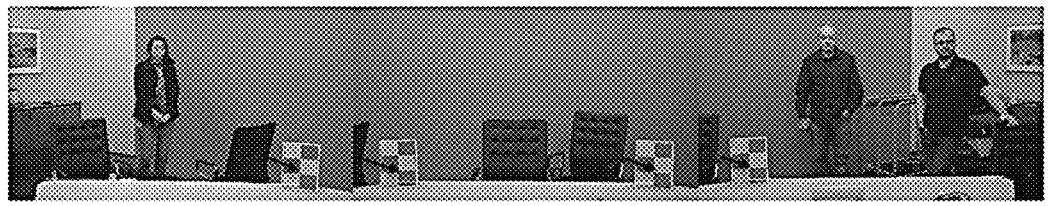

In the example of FIG. 7, a point in the target is determined, as represented by the arrows. Any point may be used, such as the intersection of multiple lines or a corner. Since three images are used, there are two targets on the table. The end images each include different ones of the targets. The center image includes both targets. The points of any of the targets in the image are detected in the overlapping regions for use as reference points to align the image pairs.

To spatially align the two images, the points are used to spatially connect the adjacent images. The side or edge of each image up to the point is removed so that the two images placed together appear continuous or panoramic. This alignment may be positioning of the vertical edges of the portion rather than actual removal of data. This provides horizontal alignment. Vertical refinement is provided by positioning the points to have a same vertical position. Any pixels moving below the bottom of the portion may be cropped, not used, or considered outside the portion.

In another embodiment, the alignment is performed using three or more reference points, a point and a line, or the entire target. Having multiple references in common allows for rotational alignment as well as translation alignment.

Figure 8:
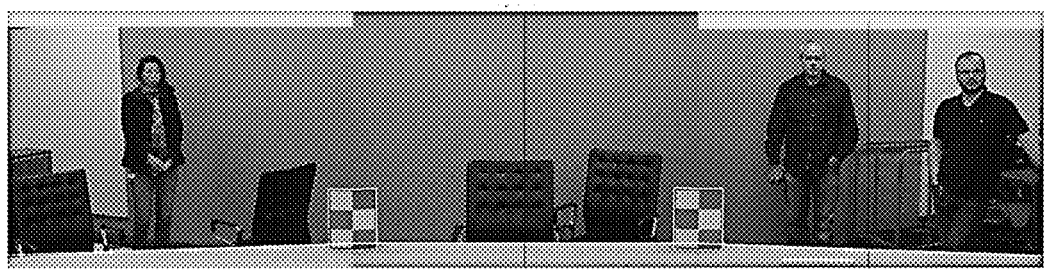

In the example of FIG. 8, the detected points are used to align the images horizontally and vertically. Assuming camera scale factors are similar by manufacture, the processor crops the end camera views. The vertical adjustment may also relatively position the images such that a top or bottom edge of the image is below the field of view of another camera. Other images may be cropped to provide similar vertical extent.

While alignment and cropping are discussed above, actual changing of positions or data removal may not occur. For example, FIG. 8 is shown to indicate the process. The processor, to identify the portion of the field of view from the captured images, may calculate a relative position or alignment without actually aligning. The processor aligns the portions without altering the images as an alignment.

In act 38, the processor scales the images to assure adjacent images match exactly. Image processing is used to determine the relative scaling of the different cameras and corresponding images. The images may be scaled relative to each other. For example, the end images may be scaled relative to the center image. The scaling may be to determine a relative size of the portions rather than changing the images.

The scaling uses reference information detected in the images. Due to the alignment, overlap is not used to determine the relative scale. In other embodiments, the overlapping information may be used even though already established to not be part of the portion identified for display.

Reference points, lines, or other objects in the images are used for scaling. By using two spaced apart locations common to both images, the scale may be determined. In one embodiment, a line associated with the target is detected in each of the adjacent images. For example, the horizontal top of the target is detected. Line detection is repeated, but the detection is localized to a neighborhood around the already determined target location. For example, the top of the target is detected as a line based on a search around the top of the target. Other searching or detection may be used. In an alternative embodiment, the line is determined based on the already detected target position. Where the target detection includes rotational correlation, the top edge or other line in the target is known based on the template positioning relative to the image.

Using the line, an intersection of the line with the cropped edge or horizontal end of the image portion is located. Due to cropping and/or alignment, left and/or right edges of the portion are known. The intersection of the horizontal line with that edge is located by the processor. To reference points along the vertical edges of the images are found.

The relative scale is set by adjusting the scale until the points align. Since one point is already aligned, aligning another point by scaling corrects the scale. One or both image portions are digitally zoomed until both points align.

Figure 9:
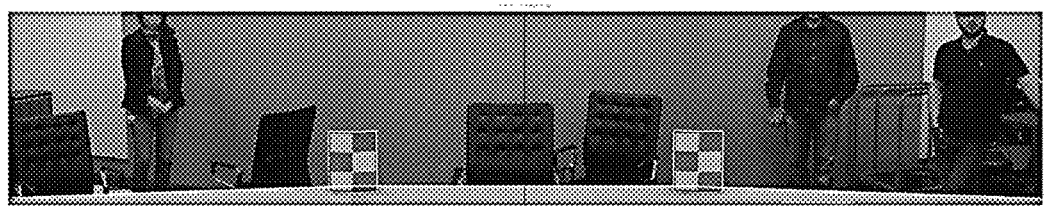

FIG. 9 shows an example. For each pair of adjacent camera views, the location of reference lines, such as the top line of the checkerboard targets, is detected. Reference points are defined as the intersection between the vertical image connecting lines and reference lines. The image scaling factors are fine tuned to match reference points of the intersection. This scaling completes the alignment both horizontally and vertically. Other or different alignment and/or scaling may be used.

Depending on the aspect ratio of the displays, the image portions are cropped to provide the desired portion. For example, the images are vertically cropped to provide a 16:9 aspect ratio. The horizontal alignment and scaling provide the horizontal extent. Since cropping the center image horizontally may remove part of the desired portion, the cropping is performed on the vertical to provide the desired ratio. Due to the larger field of view and oversampling, sufficient vertical information is available so that the portion lies entirely within the field of view for each camera.

In the three-image example of FIG. 9, the resulting view is a continuous field of view of three connected images, providing a 48:9 life size or near life size view. While not stitched together as one image in a panoramic view, the identified portions align so that a spatially continuous view without any or with only a small (e.g., 6 inches or less, 3 pixel widths or less, or other visually non-noticeable) gap between views is provided. The different portions are aligned and scaled relative to each other.

In act 40, parts of the image portions are removed, such as cropped, to account for bezels of the displays. Alternatively, this may be made part of setting the aspect ratio. The removal may be a repositioning or change in the portion of the field of view identified. Where the displays are without bezels and abut each other, act 40 is skipped. Act 40 may be skipped even for displays with bezels as the inaccuracy may not detract from the visual presentation to the user.

To account for bezels in act 40, the size of the bezels on the displays is known, pre-determined, or entered by the installer. The parts of the identified portions corresponding to the bezel are removed or the portion is adjusted so that the portions no longer have abutting fields of view.

Figure 10:
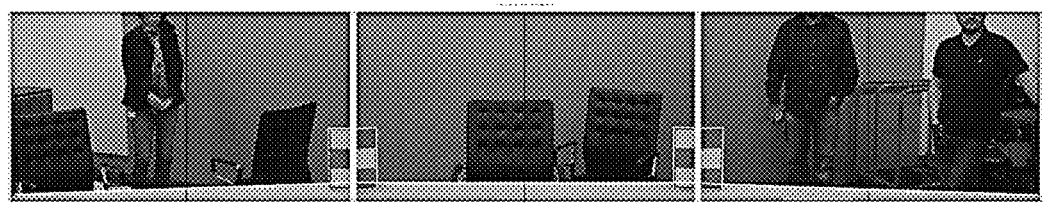

FIG. 10 shows one example where the vertical bars between the images correspond to the bezels. A width of the bezel is removed from each end of the portion. This maintains the life size or near life size presentation. Only the portions adjacent another image are removed. To accommodate screen bezels, an appropriate number of image pixels are cut off along the image connecting lines. Alternatively, both left and right side bezel regions are removed. In yet another alternative, the portion is reduced around an entire circumference.

Once the portion is altered to account for the bezel, further cropping or identification of the portion may be performed. Cropping or adjustment maintains the 16:9 ratio.

Figure 11:
FIG. 11 shows example images aligned for display in telepresence with an appearance of non-overlapping, continuous (no dead zone) field of view from multiple cameras.

FIG. 11 shows an example of the portions identified from the fields of view. FIG. 4 shows the entire field of view for each camera. Only a portion of each field of view is identified as to be used for display.

While discussed as cropping, aligning, removal, scaling or other alteration of the images themselves above, these teachings correspond to identifying the portions without any actual alteration of the images or image data. The concepts of cropping, aligning, removal, or scaling are applied to locate the portions within the field of view. Alternatively, the images are changed as part of the process.

The identified portion is mapped as a quadrilateral shape with a specific position in the camera field of view. A quadrilateral shape and position is provided for each of the fields of view of the cameras. The shape may be defined by vertices, such as four corners. The positions of the four corners define the portion of the field of view used for transmission and display during a video conference. The parts of the field of view outside the portion (outside the quadrilateral shape) are not transmitted and/or used for display.

In act 42, the spatial camera alignment is stored. Any identification of the portion within the field of view is stored. For example, the vertices of the quadrilateral representing the portion are stored. The spatial alignment, such as translation alignment and scaling, is performed as a calibration and/or during installation. The portions are stored for later use during a video conference. Rather than re-calculating the alignment each time, the previously calculated alignment is used to select the portions of later captured images for encoding, transmission, decoding and display at monitors or displays of another telepresence arrangement.

In act 44, subsequent images captured by the cameras are displayed on adjacent displays. The displays abut each other, such as having less than half-inch gap between any bezels. The displays are large for presenting an image of a person as life size or near life size. To provide a continuous view based on position of the displays, the portions corresponding to the displays are used to create the images. Since the displays are adjacent each other, a continuous view, separated only by bezels and any small gap, is provided across the series of displays. The portions are selected to provide this continuous view without overlapping of images and without dead zones other than corresponding to the display positions. The images have the desired scale and position to appear as a life size participant spaced appropriately around the local conference table.

The cameras capture the entire field of view, but just the portion appropriate for the display is provided to and used for displaying the images. The frames of data from the field of view are cropped and/or the data for the portions are selected. The cropped or selected data is used to create the image of the portion of the field of view. In real-time processing, images captured by the cameras are cropped to the quadrilateral shapes according to previously saved coordinate points. By simple linear scaling, quadrilateral shapes are transformed to rectangular shapes. The corresponding captured data are transformed linearly (i.e., scaled) for transmission and display as images. The data for the portions are transmitted over a computer network for a real-time protocol video conference.

Figure 12:
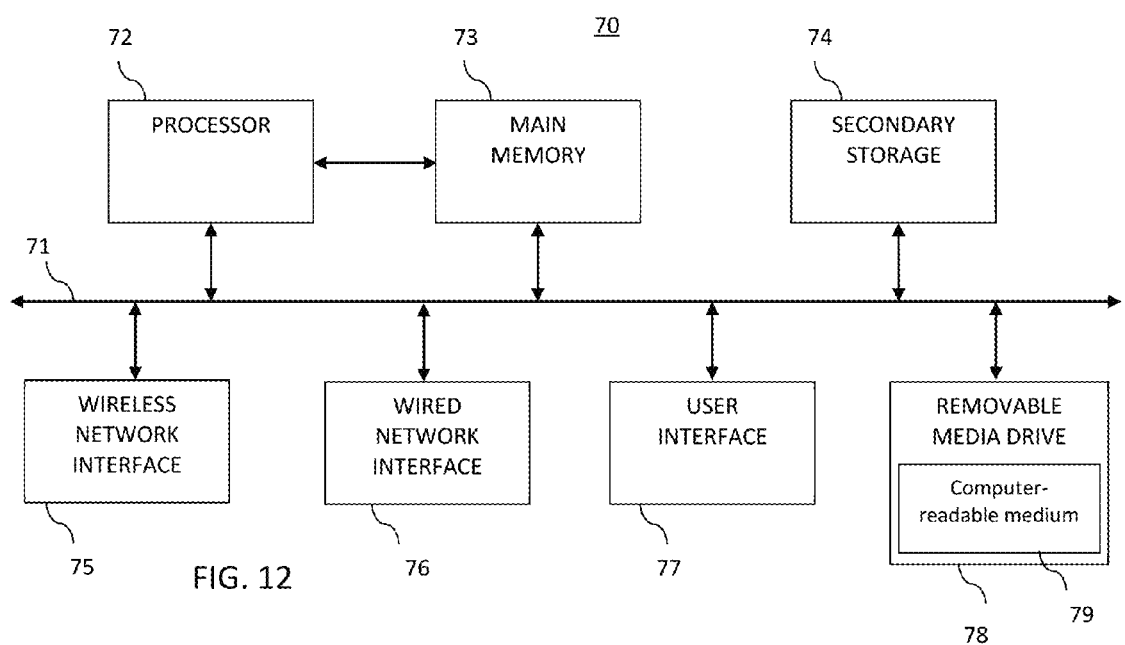
FIG. 12 is a block diagram of a telepresence device, according to one embodiment, for aligning images from different cameras.

FIG. 12 shows one embodiment of an apparatus for identifying portions of fields of view in automated camera alignment. The apparatus is shown as a simplified block diagram of an example computing device, such as the processor 18 of FIG. 1. In FIG. 12, the example computer 70 corresponds to devices that may be deployed in or used to install cameras in the video conferencing network. The computer 70 includes software and/or hardware to perform any one or more of the activities or operations for identifying portions of fields of view, such as detecting, aligning, scaling, and cropping.

The computer 70 includes a processor 72, a main memory 73, secondary storage 74, a wireless network interface 75, a wired network interface 76, a user interface 77, and a removable media drive 78 including a computer-readable medium 79. A bus 71, such as a system bus and a memory bus, may provide electronic communication between processor 72 and the other components, memory, drives, and interfaces of computer 70. The computer 70 connects with a cluster of cameras.

Additional, different, or fewer components may be provided. The components are intended for illustrative purposes and are not meant to imply architectural limitations of network devices. For example, the computer 70 may include another processor and/or not include the secondary storage 74 or removable media drive 78.

The computer 70 may be a personal computer, server, tablet, laptop, installation device, or other processor. In one embodiment, the computer 70 is a video conferencing server or user computer (e.g., personal computer, laptop, smart phone, tablet, or mobile device) with video conferencing installation software.

In one embodiment, the computer 70 is part of a video conferencing system, such as a telepresence (from Cisco) or other video conference end-point. Any device for image processing may be used.

Instructions embodying the activities or functions described herein may be stored on one or more external computer-readable media 79, in main memory 73, in the secondary storage 74, or in the cache memory of processor 72 of the computer 70. These memory elements of computer 70 are non-transitory computer-readable media. The logic for implementing the processes, methods and/or techniques discussed herein are provided on non-transitory computer-readable storage media or memories, such as a cache, buffer, RAM, removable media, hard drive or other computer readable storage media. Computer readable storage media include various types of volatile and nonvolatile storage media. Thus, 'computer-readable medium' is meant to include any medium that is capable of storing instructions for execution by computer 70 that cause the machine to perform any one or more of the activities disclosed herein.

The instructions stored on the memory as logic may be executed by the processor 72. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like.

The memory (e.g., external computer-readable media 79, in main memory 73, in the secondary storage 74, or in the cache memory of processor 72) also stores images, portion identification (e.g., vertices of quadrilaterals), detected positions, correlation results, pre-determined information, and/or geometric positions. The memory is used during the identification of the portions.

The wireless and wired network interfaces 75 and 76 may be provided to enable electronic communication between the computer 70 and other network devices via one or more networks. In one example, the wireless network interface 75 includes a wireless network interface controller (WNIC) with suitable transmitting and receiving components, such as transceivers, for wirelessly communicating within the network. The wired network interface 76 may enable the computer 70 to physically connect to the network by a wire, such as an Ethernet cable. Both wireless and wired network interfaces 75 and 76 may be configured to facilitate communications using suitable communication protocols, such as the Internet Protocol Suite (TCP/IP).

The computer 70 is shown with both wireless and wired network interfaces 75 and 76 for illustrative purposes only. While one or both wireless and hardwire interfaces may be provided in the computer 70, or externally connected to computer 70, only one connection option is needed to enable connection of computer 70 to the network. The computer 70 may include any number of ports using any type of connection option. The network interfaces 75 and/or 76 are configured to transmit or receive captured images, images for display, and/or other information.

The processor 72, which may also be a central processing unit (CPU), is any general or special-purpose processor capable of executing machine readable instructions and performing operations on data as instructed by the machine readable instructions. The main memory 73 or other memory may be accessible to processor 72 for accessing machine instructions and may be in the form of random access memory (RAM) or any type of dynamic storage (e.g., dynamic random access memory (DRAM)). The secondary storage 74 may be any non-volatile memory, such as a hard disk, which is capable of storing electronic data including executable software files. Externally stored electronic data may be provided to computer 70 through one or more removable media drives 78, which may be configured to receive any type of external media 79, such as compact discs (CDs), digital video discs (DVDs), flash drives, external hard drives, or any other external media.

The processor 72 is configured by the instructions and/or hardware to identify portions of camera fields of view to use for imaging during a video conference. The processor 72 is configured to automatically achieve image alignment in immersive telepresence or other video conferencing.

A user interface 77 may be provided to allow a user to interact with the computer 70. The user interface 77 includes a display device (e.g., plasma display panel (PDP), a liquid crystal display (LCD), or a cathode ray tube (CRT)), or may interact through the computer with a display for the telepresence or video conferencing. In addition, any appropriate input device may also be included, such as a keyboard, a touch screen, a mouse, a trackball, microphone (e.g., input for audio), camera, buttons, and/or touch pad.

Additional hardware may be coupled to the processor 72 of the computer 70. For example, memory management units (MMU), additional symmetric multiprocessing (SMP) elements, physical memory, peripheral component interconnect (PCI) bus and corresponding bridges, or small computer system interface (SCSI)/integrated drive electronics (IDE) elements. The computer 70 may include any additional suitable hardware, software, components, modules, interfaces, or objects that facilitate operation. This may be inclusive of appropriate algorithms and communication protocols that allow for the effective protection and communication of data. Furthermore, any suitable operating system is configured in computer 70 to appropriately manage the operation of the hardware components therein.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

What is claimed is:

1. A method comprising:
    capturing at least two images from a respective at least two cameras, the at least two cameras having horizontally overlapping fields of view such that the at least two images horizontally overlap;
    identifying, with a processor by image processing of the overlap of the at least two images, portions of each of the at least two images, the portions spatially corresponding to adjacent displays and not including the overlap; and displaying subsequent images captured by the at least two cameras on the adjacent displays in a video conference, the displayed images being for the portions of the field of view corresponding to the adjacent displays.

2. The method of claim 1 wherein capturing comprises capturing with the at least two cameras being in a shared housing mounted above another display, the at least two images including a table edge.

3. The method of claim 1 wherein identifying comprises aligning the at least two images horizontally and vertically using the image processing by the processor.

4. The method of claim 1 wherein identifying comprises scaling the at least two images using the image processing by the processor.

5. The method of claim 1 wherein identifying comprises:
    detecting, by the processor, a table edge in each of the at least two images;
    calculating an angle to position the table edge at a first distance above a bottom of the portion for a first one of the at least two images; and
    calculating a rotation of a second one of the at least two images based on the table edge detected in the second one of the images.

6. The method of claim 1 wherein identifying comprises:
    detecting, by the processor, a camera pointing angle for each image;
    calculating an image de-warp as a function of the camera pointing angle.

7. The method of claim 1 wherein identifying comprises:
    detecting, by the processor, a point on a target in the overlap of each of the at least two images; and
    aligning the at least two images horizontally and vertically using the points in each of the at least two images.

8. The method of claim 7 wherein identifying further comprises:
    cropping the at least two images to remove the overlap in each of the at least two images;
    detecting a line for the target in each of the at least two images; and
    scaling a first one of the at least two images relative to a second one of the at least two images as a function of the line in each of the at least two images.

9. The method of claim 1 wherein identifying comprises removing parts of the at least two images to account for bezels of the adjacent displays, the portions not including the removed parts.

10. The method of claim 1 wherein identifying comprises mapping the portions as quadrilateral shapes within the fields of view of the cameras.

11. The method of claim 1 wherein displaying comprises:
    capturing full images of the fields of view of the at the least two cameras;
    cropping the full images of the fields of view to the portions of the fields of view, the cropped full images being the subsequent images;
    transmitting the subsequent images over a computer network; and
    displaying the subsequent images on the adjacent displays remote from the at least two cameras.

12. The method of claim 1 wherein the at least two images and at least two cameras comprise three images of three cameras, and wherein identifying comprises identifying with a center of the three images as a reference image.

13. The method of claim 1 wherein identifying comprises identifying without manual adjustment of the fields of view of the at least two cameras relative to each other.

14. Logic encoded in one or more non-transitory computer-readable media that includes code for execution and when executed by a processor is operable to perform operations comprising:
    acquiring images from video conferencing cameras with overlapping fields of view;
    aligning the fields of view by digital image processing of the images, wherein aligning comprises selecting non-overlapping parts of the overlapping fields of view from information detected in the images, the non-overlapping parts selected by a processor to align and scale the non-overlapping parts relative to each other; and
    storing a spatial alignment of the fields of view as a calibration.

15. The logic of claim 14 wherein acquiring comprises acquiring the images where the images include a table and a target, the target in an overlap portion of the overlapping fields of view.

16. The logic of claim 14 wherein aligning comprises detecting a table edge in each of the images and rotating one image relative to another image as a function of the detected table edges.

17. The logic of claim 14 wherein aligning comprises determining an aim down angle for each of the video conferencing cameras and de-warping each image as a function of the respective aim down angle.

18. The logic of claim 14 wherein aligning comprises detecting a reference point in each of the images, the reference point being in an overlap of the overlapping fields of view, and horizontally and vertically aligning the images with the reference points.

19. The logic of claim 14 further comprising scaling at least one of the images relative to another of the images with image processing determined reference points in each of the images.

20. An arrangement comprising:
    a cluster of cameras having overlapping fields of view;
    a memory configured to store frames of data from the cameras, the frames of data representing the overlapping fields of view;
    a processor configured to select non-overlapping parts of the fields of view from information detected in the frames of data, the non-overlapping parts selected by the processor to align and scale the non-overlapping parts relative to each other.

21. The arrangement of claim 20 further comprising a table with a target, and wherein the processor is configured to select as a function a table edge detected in the frames of data and the target detected in the overlapping parts of the field of view represented in the frames of data.

* * * * *